United States Patent
Park et al.

(10) Patent No.: US 7,434,037 B2
(45) Date of Patent: Oct. 7, 2008

(54) SYSTEM FOR TARGET BRANCH PREDICTION USING CORRELATION OF LOCAL TARGET HISTORIES INCLUDING UPDATE INHIBITION FOR INEFFICIENT ENTRIES

(75) Inventors: Il Park, White Plains, NY (US); Mauricio J. Serrano, Bronx, NY (US); Jong-Deok Choi, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 11/399,979

(22) Filed: Apr. 7, 2006

(65) Prior Publication Data
US 2007/0239974 A1    Oct. 11, 2007

(51) Int. Cl.
*G06F 9/32* (2006.01)
(52) U.S. Cl. .................................. 712/238
(58) Field of Classification Search ............. 712/238, 712/237–240
See application file for complete search history.

(56) References Cited

U.S. PATENT DOCUMENTS 5,758,142 A *  5/1998  McFarling et al. .......... 712/239
2003/0212882 A1 * 11/2003  Bonanno et al. ............ 712/238
2004/0215720 A1 * 10/2004  Alexander et al. .......... 709/204

OTHER PUBLICATIONS

Yahoo! Education, definition of "existing".*
Yahoo! Education, Dictionary definition for "embed", www.yahoo.com.*

* cited by examiner

*Primary Examiner*—Richard Ellis
(74) *Attorney, Agent, or Firm*—Michael J. Buchenhorner; Douglas W. Cameron

(57) ABSTRACT

An information processing system includes a branch target buffer (BTB) comprising the last next address for the instruction and for receiving an indirect instruction address and providing a BTB predicted target; and next branch target table (NBTT) for storing potential branch targets based on a history of the branch and for providing an NBTT when the a BTB predicted target is not successful. In another embodiment a system comprising a plurality of branch prediction resources dynamically predicts the best resource appropriate for a branch. The method includes predicting a target branch for an indirect instruction address using a resource chosen among the plurality of branch prediction resources; and selectively inhibiting updates of the branch prediction resources whose prediction accuracy does not meet a threshold.

6 Claims, 3 Drawing Sheets

SYSTEM FOR TARGET BRANCH PREDICTION USING CORRELATION OF LOCAL TARGET HISTORIES INCLUDING UPDATE INHIBITION FOR INEFFICIENT ENTRIES

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of information processing systems, and more particularly relates to the field of microprocessors and more specifically to instruction branch predictor architectures.

BACKGROUND OF THE INVENTION

A branch instruction is an instruction that switches the system CPU (central processing unit) to another location in memory. A branch prediction is a prediction of the outcome of a branch instruction such that the system prefetches those instructions and executes them in parallel with the current instructions. If the prediction is wrong the system must waste processing cycles fetching the correct instruction.

The basic dataflow for an instruction is: instruction fetch, decode, cache access, execute, and result write back. Instructions enter the pipeline in program order. Any delay in instruction fetch adds latency and so hurts the performance.

Branch target prediction is employed in many processors to predict the target of an indirect branch. An indirect branch is a branch whose target is computed at run-time. A common example of an instruction sequence using an indirect branch is an instruction loading a register from a table, followed by the branch using the target stored in the register. Many high-level programming languages employ indirect branches. For example, in object-oriented languages such as Java, C++, and C#, indirect branches can be used for virtual function calls, where the target of a branch is obtained from a set of potential targets by examining the content of an object. Another example is the C/C++/Java switch statement, where the target could be obtained from a table indexed by the value in the statement. There is a need for predicting targets that may be employed in situations where a given branch has multiple targets, and/or subroutine returns and many branches with computed targets.

SUMMARY OF THE INVENTION

Briefly according to an embodiment of the invention, an information processing system comprises a branch target buffer (BTB) comprising the last next address for the instruction and for receiving an indirect instruction address and providing a branch target buffer (BTB) predicted target; and a Next Branch Target Table (NBTT) for storing potential branch targets based on a history of the branch and for providing an NBTT when a BTB predicted target is not successful. According to another embodiment, the tables are updated as more target predictions are made except when they are inhibited to update when a miss occurs.

DETAILED DESCRIPTION

Figure 1:
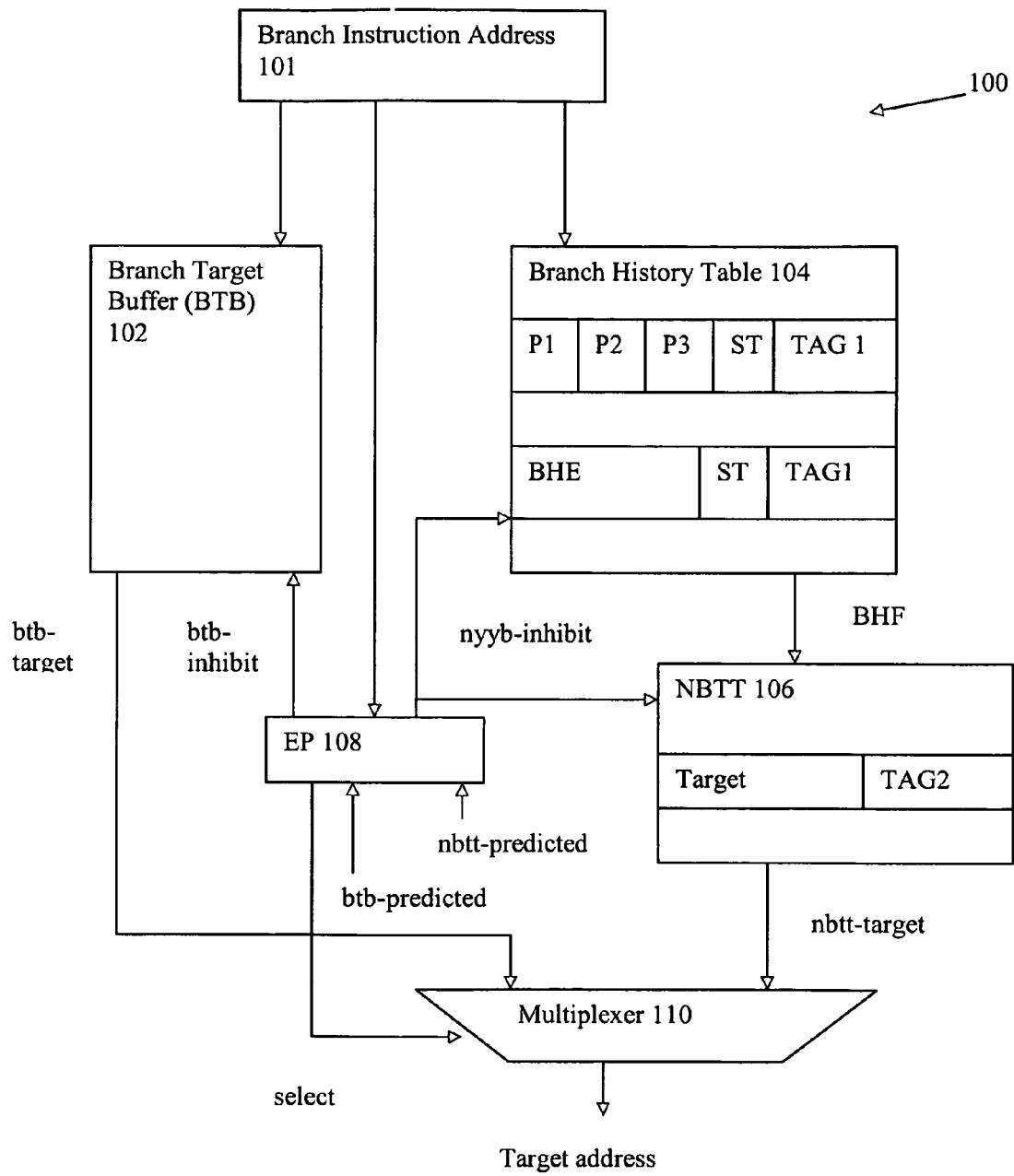
FIG. 1 is a general interconnection diagram of a preferred embodiment of the invention.

Referring to FIG. 1, an embodiment of the invention is shown. According to this embodiment, hardware for target branch prediction can be implemented in current processor designs. An apparatus 100 predicts multiple targets for a single branch using a plurality of tables to enhance an existing predictor branch target buffer (BTB) 102, described in prior art. A branch history table (BHT) 104 is used to capture local past target information 101 of an indirect branch in an efficient way. We introduce a Branch Hashing Function (BHF) used to index a Next Branch Target Table (NBTT) 106 which will predict the next target of a branch. Finally, we use an exclusion predictor table (EP) 108 which keeps track of prediction accuracy and inhibits updating some of the tables based on prediction effectiveness. Inhibiting update of ineffective entries in the table prevents premature aging and eviction of effective entries due to ineffective ones. The EP table 108 is used to further enhance the efficiency of storing entries in the tables, thus making it possible to have the same prediction accuracy with smaller tables than comparable tables with more entries. In another embodiment, the EP table 108 can be embedded into an existing predictor, to further reduce circuit complexity. The system includes a multiplexer 110 activated by the EP 108 to select the output, a predicted target, to present at the output of the system. The outputs can be the BTB target or the NBTT target.

The system 100 enhances the performance of existing systems by adding extra circuitry to be used for cases where a branch can be predicted with local history information. The system 100 can make a decision as to whether to employ an existing predictor (the BTB 102) to predict some branches, or to employ an alternate prediction mechanism to predict a branch falling into the scope of the system 100. Furthermore, the system 100 can better manage resources by dynamically selecting the best resource appropriate for a particular branch. This has the effect of employing fewer resources for a particular branch, thus reducing sources of conflict caused by limited table sizes, and the like.

A first embodiment exploits the local history of an indirect branch to make a prediction of the most likely target of a branch. The local branch history is the history of the targets taken by a branch. For example, the branch B1 may have the following history: B1={A1, A2, A3, A4, A5, ... }. Thus, the branch B1 has successive targets A1, A2, A3, A4, A5, and so on. It is often possible to predict the next target of a branch based on its previous history. For example if the history of the branch is B2={A1, A2, A3, A1, A2, A3 ... } then the next target of the branch B2 can be predicted by examining the previous target of a branch. Thus, if the previous target is A2 we can make a prediction that the next target will be A3, if the previous target is A3 we can predict A1, and so on. In another example, the branch B3 may have the history B3={A1, A1, A2, A2, A3, A1, A1, A2, A2, A3, A1 . . . }. Thus, we can only predict A2 if we examine the last two previous targets {A1, A1} because the target A1 may be followed by either A1 or A2. In our final example, the branch B4 may have the history B4={A1, A1, A1, A1, . . . }, thus we can always predict the next target as the same previous target. To efficiently exploit hardware resources, our method learns how to recognize these cases by employing separate predictors for different branches, according to branch characteristics.

Our method uses the NBTT 106 which is a correlation table storing the potential branch targets, based on the history of the branch. In this embodiment, the NBTT table 106 implements a state machine, where the table index represents the current state of the branch, and the content of the table at that index represents the future state of the branch, or next target. FIG. 1 shows an example of an NBTT 106, where the index into the table is obtained by the combination of several branch characteristics, for example: the past local target history and the current program counter. We can also include a thread identification which could be useful in simultaneous multi-processor (SMT) processors running several threads simultaneously. For example, if two SMT threads are supported, we could add one bit to identify a thread.

Figure 2:
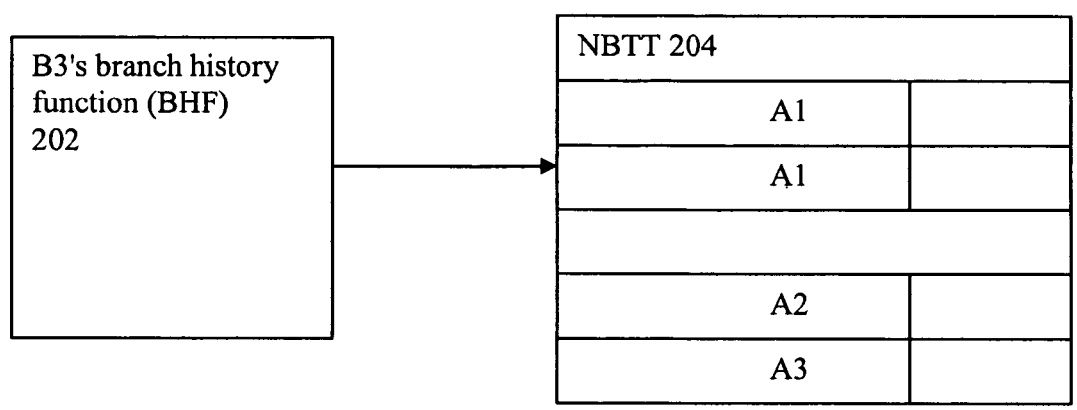
FIG. 2 is a high level block diagram showing an NBTT for the example B3={A1, A1, A2, A3, A1, A1, A2, A3, A1, ... }.

FIG. 2 illustrates how the content of an NBTT 204 table can predict the branch target for our previous example of the branch B3 202. The table predicts the target A1 in two contexts: when the most recent past local history is {A3, A1}, or when the most recent history is {A2, A3}. In the former, the BHT 104 has an entry with a matching branch history of {A3, A1}. The BHF, applied to this entry, generates the index into NBTT 106 that contains A1 as the branch target. Similarly, in the latter, there exists another entry in the BHT 104 for {A1, A1} that, when applied to the BHF, generates the index into NBTT with A1 as the branch target. Similarly, the table predicts A2 for the history {A1, A1}, and A3 for the history {A1, A2}. The table NBTT 106 can be further optimized for space by replacing the target address with an index into a second table. Thus, for the example, instead of storing two A1 branch targets, we can store two smaller indices into NBTT 106 and an index into an additional table which will contain only one entry for the target A1.

The BHT 104 stores a local branch history for the past N targets of a branch in an encoded form. FIG. 1 illustrates a history table which stores the last three targets of a branch, indexed by a branch address. P1 maintains bits for the most recent branch target, P2 for the next older target, and P3 for the oldest target. Not all the bits of a target are stored, therefore |P1|<|target size|. Similarly, older targets may require less information. There is also a state machine using ST bits to keep track of replacement policies, in case the table is associatively indexed, as understood in well-known prior art. Finally, there is an optional matching TAG1, TAG2, TAG3, . . . used to improve matching accuracy, by finding whether the particular entry matches the program counter (PC) used to index the entry, although it does not need to match all the bits of the PC.

Upon a new target outcome, some of the bits of the branch target (BT) are copied into P1, some of the bits in P1 are copied into P2, and some of the bits in P2 are copied into P3. We do not need as many bits for older targets than for newer targets, therefore |P3|<|P2|<|P1|<|BT|. Typically, a few low order bits can be used to keep track of the P1 branch target, for example by taking the low-order 9 bits of a branch address and dropping the 2 low-order bits, for a total storage of 7 bits. Fewer bits are required for P2 and P3, for example 4 and 1, respectively.

In another embodiment a novel method efficiently computes a branch history function which will be used to index the NBTT 106 table. The method computes the branch history function (BHF) as follows, where A+B is the XOR function between operands A and B, and P<<SH is the binary shift left operator of operand P by a number of bits SH. The binary shift right operand is >>. Only a number of resulting bits are used to index into the NBTT:

$$BHF=(PC>>p)+(P1)+(P2<<SH2)+(P3<<SH3)$$

Figure 3:
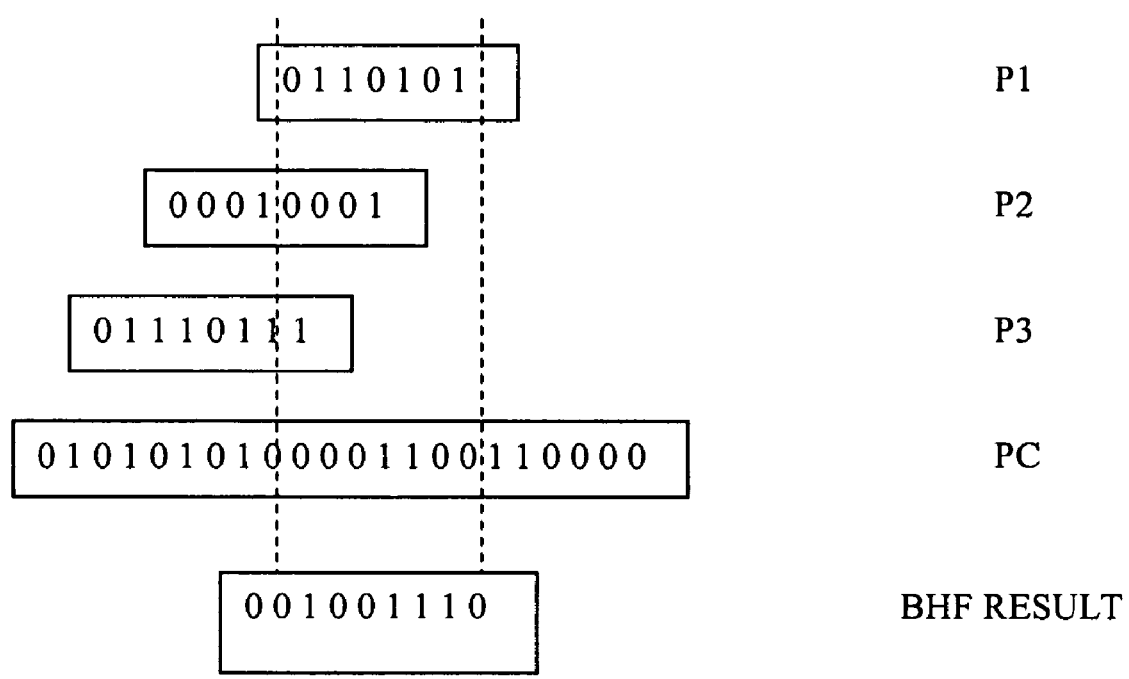
FIG. 3 is an example of computing a branch history function (BHF).

In other words, our BHF combines several bits of the past targets of a branch, giving less importance to older histories. Graphically, this can be illustrated with the following example:

For FIG. 3, the BHF is computed as (PC>>4)+(P1)+(P2<<3)+(P3<<6). An alternative way to store more concise past history in the BHT can be accomplished if the shift amounts given in the previous formula are always proportional to the age of the target; in our example, 3 and 6 for targets P2 and P3. Therefore, it is not necessary to explicitly store the past targets for a branch, but rather the BHE (Branch History Entry) will contain the hashing of P1, P2, and P3. The branch history will be computed from the BHE, and the BHE will be updated to reflect the new target of the branch (BT):

$$BHF=(PC>>p)+(BHE) \text{ (performed prior to accessing NBTT)}$$

$$BHE=(BHE<<SH)+BT \text{ (performed after the target is known)}$$

The BHF function will produce a hashing function used to index the NBTT table, using a few bits obtained from the result, as shown in FIG. 1. An optional TAG2 stored in the indexed entry in the NBTT 104 can be used to improve the accuracy of the matching process, by comparing the tag to some extra bits produced by the BHF function which were not used in the index process. The result of the NBTT 106 will be a target address predicted for a particular branch.

We combine a) dynamically predicting the best resource appropriate for a particular branch, and b) selectively inhibiting table updates for predictors whose prediction accuracy has not been high enough. Prior art using hybrid predictors only considered the case of selecting the most appropriate predictor for a branch. We use an exclusion predictor (EP) which inhibits updating information into a table, if the predictor performs poorly; this has the effect of employing fewer resources for a particular branch, thus reducing sources of conflict caused by limited table sizes, etc. An important observation is that EP will not try to flush existing entries from the tables when a predictor performs poorly, which is typically a very expensive operation since it involves searching in the table. Rather EP will inhibit updating the normal process of entry updating employed in many table schemes, which will naturally age some entries and eventually will replace old entries with newer, more predictable entries. An example of replacement schemes are: a) for direct mapped tables, replacement of an entry at the same index, b) for set-associative mapped tables, replacement of an entry using a scheme such as LRU (least-recently used) or similar schemes, as it is well-known from prior art.

The EP 108 receives two binary inputs, as illustrated in FIG. 1: the accuracy of prediction via a BTB predictor (btb_predicted) and the accuracy of prediction via our novel predictor (NBTT_predicted); a value of 1 in an input will indicate a correct prediction, while a value of 0 will indicate an incorrect prediction. One output of EP will be the select signal to choose one predicted target (select) which will be 0 for the existing predictor, and 1 for the NBTT predictor. Other outputs are the inhibit signals for both predictors (btb_inhibit, NBTT_inhibit) which will be 1 for inhibit and 0 for normal operation.

In another embodiment, we use a confidence table, which will be accessed by indirect branches. Each entry in the confidence table has a counter, whose value varies from zero to N. Typically, this is implemented as a binary saturating counter. For example, if we used a 3-bit saturating counter, the possible values of the counter are [0, 1, 2, 3, 4, 5, 6, 7].

When a program or a thread starts, each value in the confidence table can be initialized to a predefined value (i.e., to zero). The output of the counter can be used to decide the course of action. A low value of the counter will indicate that the BTB predictor performs better, thus the select output will be 0. Conversely, a high value will indicate that the NBTT predictor performs better, thus the select output will be 1. A very low value of the counter can be used to indicate that it is better to use the BTB predictor, thus the btb_inhibit and NBTT_inhibit outputs will be 0 and 1, respectively. Conversely, a very high value of the counter can be used to indicate that it is better to use the NBTT predictor, thus the btb_inhibit and NBTT_inhibit outputs will be 1 and 0, respectively. In any other case, these two outputs will be both 0.

Table 1 illustrates the possible states that the counter in the confidence table represents. As an example, we present the case of having four states (S0, S1, S2, S3). The table shows how the count values represent the different states and what to do depending on the relevant state. The first row shows what to update when a branch commits. For instance, if the counter value relevant to the current branch is within a range between zero and F1(N)-1, we are going to update BTB only. If the value is within a range between F1(N) and F2(N)-1, we are going to update both BTB and NBTT. As an example, we can define Fm(N) as m*N/4.

contents of this table can be extended or simplified. For example, we can merge S2 and S3, or we can delete one of the states above.

Now, we explain how to change the counter value and so the state of each branch. The following table shows an exemplary case of how to update the counter in the table depending on the various conditions of BTB 102 and NBTT 106. The basic idea that this table tries to implement here is following:
1. Push the state into the direction of so if BTB 102 works well.
2. Push the state into the direction of S3 if BTB 102 fails because the current branch clearly has multiple targets.
3. Push the state into the middle, so both BTB 102 and NBTT 106 can be updated if the situation is fuzzy (unclear).

TABLE 2

How to update the states in the confidence table.

| BTB | NBTT | What to do |
| --- | --- | --- |
| Tag Match: Target Hit | Don't care | Move to the direction of S0 by decrementing the counter |
| Target Miss | Don't care | Move to the direction of S3 by incrementing the counter |
| Tag Mismatch | Target Hit | Do not change |
| | Target Miss | Go to S1 |
| | Tag Mismatch | Go to S1 if the current state is S2 or S3 Otherwise, do not change |

Again, these two tables only illustrate one possible exemplary case of an embodiment of the invention. The functions and methods presented here should not limit the scope of this invention.

Therefore, while there has been described what is presently considered to be the preferred embodiment, it will understood

TABLE 1

How to use the counter value of the confidence table.

| States | S0 | S1 | S2 | S3 |
| --- | --- | --- | --- | --- |
| Counter Values | 0 ... F1(N)-1 | F1(N) ... F2(N)-1 | F2(N) ... F3(N)-1 | F3(N) ... N |
| What to update | Update BTB | Update BTB Update NBTT | Update BTB Update NBTT | Update NBTT |
| What to use | Use BTB | Use BTB | Use NBTT | Use NBTT |

If only BTB 102 (or NBTT 106) has a tag-matched entry, the outcome from BTB 102 (or NBTT 106) will be used without consulting the counter value in the confidence table. If both BTB 102 and NBTT 106 have a tag-matched entry, deciding which outcome should be used as a predicted value can affect the target prediction accuracy.

The second row in the table illustrates which predictor should be used, only when both BTB and NBTT have a tag-matched entry and generate a target prediction. If the counter value belongs to S0 (or to S3), then we can assume that BTB 102 (or NBTT 106) has very high confidence in predicting a target for the current branch. Hence, we are going to use the result from BTB 102 (or NBTT 106). If the counter value belongs to S2 (or to S3), we can use the result from BTB 102 (or NBTT 106) even though we update both BTB 102 and NBTT 106 at the current state. This table shows only one exemplary case of our invention. In a real implementation, the by those skilled in the art that other modifications can be made within the spirit of the invention.

We claim:
1. A computer-implemented method to predict multiple targets for a single branch, the method comprising steps of:
   receiving an indirect branch instruction;
   searching a branch target buffer (BTB) for a target of the indirect branch instruction, the branch target buffer comprising a last next address for the instruction;
   if the target is not found in the BTB, searching a next branch target table (NBTT) comprising potential branch targets based on a history of the branch;
   updating the table where a successfully predicted target is found;
   inhibiting updates to the table for those branch targets found to be poor predictors; and
   providing as output a target address predicted for the indirect branch instruction.

2. The method of claim 1 further comprising keeping track of prediction accuracy.

3. The method of claim 1, further comprising a hashing function used to index the NBTT.

4. The method of claim 1 wherein the NBTT implements a state machine having a table index that represents the current state of a branch and the content of the table at the index represents the future state of the branch.

5. In a system comprising a plurality of branch prediction resources a method for dynamically predicting the best resource appropriate for a branch, a method comprising:
   using a branch history table (BHT) to capture local past target information of an indirect branch, and to index the NBTT, the BHT performing a Branch Hashing Function (BHF);
   predicting a target branch for a indirect instruction address using a resource chosen among the plurality of branch prediction resources;
   selectively inhibiting updates of the branch prediction resources whose prediction accuracy does not meet a threshold;
   keeping track of prediction accuracy; and
   inhibiting updating of the NBTT and BHT with inefficient entries.

6. The method of claim 5 wherein the resources are tables.

* * * * *